(12) United States Patent
Urbaniak et al.

(10) Patent No.: US 8,713,771 B2
(45) Date of Patent: May 6, 2014

(54) PROCEDURE AND DEVICE FOR ASSEMBLY OF A FLEXIBLE SEAL ELEMENT ON AN ELECTRICAL CONDUCTOR

(75) Inventors: Andreas Urbaniak, Muenster (DE); Bernd Eder, Wuppertal (DE)

(73) Assignee: Delphi Technologies, Inc., Troy, MI (US)

( * ) Notice: Subject to any disclaimer, the term of this patent is extended or adjusted under 35 U.S.C. 154(b) by 537 days.

(21) Appl. No.: 13/011,956

(22) Filed: Jan. 24, 2011

(65) Prior Publication Data

US 2011/0185549 A1 Aug. 4, 2011

(30) Foreign Application Priority Data

Feb. 4, 2010 (EP) .................................. 10001148
Mar. 23, 2010 (EP) .................................. 10003072

(51) Int. Cl.
  *B23P 19/02* (2006.01)
  *B23P 19/04* (2006.01)
  *B23P 19/00* (2006.01)
(52) U.S. Cl.
  USPC ................................. 29/235; 29/238; 29/754
(58) Field of Classification Search
  USPC ........... 29/235, 244, 253, 255, 271, 278, 280, 29/238, 239, 243.5; 277/314
  See application file for complete search history.

(56) References Cited

U.S. PATENT DOCUMENTS

| | | | |
|---|---|---|---|
| 2,657,454 A | 11/1953 | Huyett | |
| 4,302,917 A | 12/1981 | Fermvik et al. | |
| 5,016,346 A * | 5/1991 | Gerst et al. | 29/235 |
| 5,432,996 A * | 7/1995 | Imgrut et al. | 29/754 |
| 5,617,619 A * | 4/1997 | Knudson | 29/21.1 |
| 7,578,055 B2 * | 8/2009 | Rapp | 29/798 |

FOREIGN PATENT DOCUMENTS

| | | |
|---|---|---|
| FR | 2 436 319 | 4/1980 |
| JP | 04 104488 | 4/1992 |
| JP | 05 266959 | 10/1993 |
| JP | 5 299149 | 11/1993 |
| JP | 10 271638 | 10/1998 |

OTHER PUBLICATIONS

European Search Report dated Jun. 15, 2010.

* cited by examiner

*Primary Examiner* — Lee D Wilson
*Assistant Examiner* — Seahee Yoon
(74) *Attorney, Agent, or Firm* — Robert J. Myers (57) ABSTRACT

The present invention concerns an apparatus for use in the assembly of an elastic sealing element on an electrical conductor as well as a method for sheathing an electrical conductor with an elastic sealing element. The apparatus according to the invention has a first pin which performs a reciprocating movement and at the front end of which is formed a cutting tip which, on penetration through a sealing element positioned in front of the cutting tip in the direction of reciprocation and designed as a solid body, produces a through-opening in the sealing element. Furthermore, the apparatus comprises a second pin for receiving the sealing element which has been provided with a through-opening by the first pin, wherein the outer circumference of the second pin in at least one region is larger than the outer circumference of the first pin for expansion of the through-opening produced in the elastic sealing element.

7 Claims, 6 Drawing Sheets

PROCEDURE AND DEVICE FOR ASSEMBLY OF A FLEXIBLE SEAL ELEMENT ON AN ELECTRICAL CONDUCTOR

TECHNICAL FIELD OF THE INVENTION

The present invention concerns an apparatus for use in the assembly of an elastic sealing element on an electrical conductor. Furthermore, the invention concerns a method for sheathing an electrical conductor with an elastic sealing element as well as an elastic sealing element of this kind.

BACKGROUND OF THE INVENTION

In the motor vehicle industry, endeavors are continually being made to reduce the vehicle weight in favor of fuel economy. Since usually not inconsiderable quantities of electrical conductors as well as cable harnesses composed of electrical conductors are laid in motor vehicles, the motor vehicle industry is also endeavoring to reduce the weight of cable harnesses, on account of which the copper cross-sections of the conductors are reduced to values of between approximately 0.13 $mm^2$ and approximately 0.08 $mm^2$, so that the diameter at the outer surface of the insulation of these electrical conductors with a reduced cross-sectional area is only approximately 0.8 mm.

However, this proves to be a problem insofar as electrical conductors of this kind with a reduced outside diameter can no longer be sheathed in the traditional manner with an elastic sealing element which during its manufacture by injection moulding has already been made with a through-opening for receiving an electrical conductor. Thus with an inside diameter of approximately 0.65 to 0.8 mm the manufacturing limit of such through-openings passing through a sealing element is reached, as a result of which the contraction or compression force which is applied by the sealing element to an electrical conductor introduced into its through-opening is not always sufficient to ensure adequately tight sealing.

SUMMARY OF THE INVENTION

It is therefore the object of the invention to provide an apparatus and a method by which adequately tight sealing between the electrical conductor and the sealing element can be ensured even in the case of very thin electrical conductors.

According to the method of the invention, in the sealing element is first produced a through-opening with a first equivalent diameter, which extends substantially linearly through the sealing element. This through-opening involves a three-dimensional cut or penetration of which the equivalent diameter is preferably less than 0.1 mm. The through-opening produced in this way with a first equivalent diameter is then expanded or stretched elastically to a second equivalent diameter which is slightly larger than the respective electrical conductor which is to be sheathed with the elastic sealing element. Thus the second equivalent diameter should for example be of the order of magnitude of approximately 1 mm or more, if the electrical conductor has an outside diameter of 0.8 mm.

After the through-opening has been expanded in this way to the second equivalent diameter, an electrical conductor can then be introduced into the through-opening expanded to the second equivalent diameter, so that the electrical conductor extends completely through the sealing element. In order now to produce adequately tight sealing between the electrical conductor and the sealing element, the through-opening expanded to the second equivalent diameter is then caused to shrink or contract, with the result that tight sealing can be ensured between the electrical conductor and the elastic sealing element.

As the through-openings in the sealing element cannot always be made round, it is not the diameter that is used as the reference variable here, but the equivalent diameter; in this case it corresponds to the diameter of a round through-opening of which the inner circumference corresponds to the inner circumference of the through-opening under consideration. Likewise the cross-sectional area can be used as the reference variable, so that the equivalent diameter corresponds to the diameter of a round through-opening of which the cross-sectional area corresponds to the cross-sectional area of the through-opening under consideration.

The through-opening having a first equivalent diameter can be produced in the sealing element for example by subjecting it to a liquid or gas jet or generally a nozzle jet which cuts the desired through-opening in the sealing element with a first equivalent diameter. The through-opening produced in this way can then be expanded to the second equivalent diameter for example mechanically or thermally for example by the action of heat on the sealing element, so that after introduction of an electrical conductor into the through-opening expanded in this way, the elastic sealing element or the expanded through-opening can be caused to contract in the desired manner, for example by cooling the elastic sealing element.

Of course the method according to the invention can be carried out in the manner described above using a nozzle jet as well as mechanical and/or thermal action on the elastic sealing element; advantageous embodiments of the method according to the invention are however apparent from the following description and the drawings.

Thus according to one embodiment it is provided that the through-opening having a first equivalent diameter is produced in the sealing element by piercing the latter with a pointed, thin and preferably round object such as for example a piercing needle of which the shaft diameter corresponds to the first equivalent diameter. The through-openings having a first equivalent diameter that are produced in this way can then be expanded to the second equivalent diameter for example in the manner described above by mechanical and/or thermal action on the elastic sealing element.

According to a further embodiment it is provided that the through-opening having a first equivalent diameter which is produced by means of a nozzle jet or a piercing needle is expanded to the second equivalent diameter by passing a hollow needle through the through-opening produced with the first equivalent diameter, of which the shaft diameter corresponds to the second equivalent diameter. Expansion of the through-opening having the first equivalent diameter to the second equivalent diameter by means of a hollow needle here proves to be advantageous insofar as introduction of the electrical conductor into the through-opening by inserting it in the hollow needle itself is facilitated by this means.

According to a further embodiment it can be provided that the electrical conductor is introduced into the through-opening which has been expanded to the second equivalent diameter, by introducing the electrical conductor into the hollow needle and then pulling the hollow needle out of the sealing element, so that the electrical conductor remains in the through-opening which then contracts by itself due to the elasticity of the sealing element. Due to the fact that the through-opening having the first equivalent diameter has been produced with an equivalent diameter which is smaller than the outside diameter of the electrical wire, tight sealing can therefore be ensured between the electrical conductor and the elastic sealing element. On account of the elasticity of the material from which the sealing element is made, the through-opening has a tendency to contract again after removal of the hollow needle, with the result that the electrical conductor has applied to it a compressive force by which not only is tight sealing produced in relation to the sealing element, but the electrical conductor is also held frictionally in the sealing element. In other words, therefore, by pulling the hollow needle out of the sealing element in the desired manner, contraction of the through-opening which has been expanded to the second equivalent diameter is brought about in order to seal off the electrical conductor from the elastic sealing element.

To prevent material from being removed at the inner circumference of the through-opening by the sharp front edge at the tip of the hollow needle when the hollow needle is introduced into the through-opening having the first equivalent diameter, according to a further embodiment it is provided that the hollow needle is passed through the through-opening produced with the first equivalent diameter, by placing the hollow needle over the piercing needle, which is still located in the sealing body, and sliding it over it. The through-opening with the first diameter does not therefore have the opportunity to contract, before introduction of the hollow needle into the sealing body, to a diameter which is smaller than the first equivalent diameter, as a result of which, when the hollow needle is introduced into the through-opening, no material is removed from the inner circumference of the through-opening particularly if the inside diameter of the hollow needle corresponds substantially to the outside diameter of the piercing needle.

Admittedly, the electrical conductor can be introduced into the hollow needle after the piercing needle has been pulled out of the hollow needle. As the electrical conductor has, however, a certain risk of buckling due to its very small diameter, it may prove advantageous to introduce the electrical conductor into the hollow needle already while the piercing needle is being pulled out of the hollow needle. Thus for example the electrical conductor can be attached to the tip of the piercing needle which is stuck through the sealing body, so that the electrical conductor is pulled into the hollow needle by the fact that the piercing needle is pulled out of the hollow needle. The electrical conductor is thus introduced into the hollow needle in the same direction in which the piercing needle is pulled out of the hollow needle.

From a manufacturing point of view, however, it may also prove advantageous to introduce the electrical conductor into the hollow needle in the same direction in which the piercing needle is introduced into the hollow needle. In this case any apparatuses and insertion aids for introducing the electrical conductor and piercing needle into the hollow needle have to be provided on only one side of the sealing element, as a result of which these apparatuses and insertion aids can be assigned a dual function.

As has already been indicated above, production of the through-opening with a first equivalent diameter and/or expansion of the through-opening which has been produced with a first equivalent diameter to a second equivalent diameter should be effected without removal of material, so that sealing as tight as possible between the electrical conductor and the sealing element can be ensured as a result of contraction of the through-opening after removal of the hollow needle from the sealing element has taken place. If, on the other hand, material were to be removed along the inner circumference of the through-opening during production or expansion of the through-opening, there would be a risk of a gaping gap remaining between the sealing element and the electrical conductor at the point of material removal after the hollow needle is pulled out of the sealing element, so that tight sealing is not guaranteed there.

Although production of the through-opening with a first equivalent diameter and expansion thereof to a second equivalent diameter in the manner described above can be effected in two successive steps, from a manufacturing point of view it may prove advantageous to perform these two steps immediately following one another or smoothly merging with one another, by sticking the piercing needle together with the hollow needle which has been slid over it in the sealing element. Particularly if the tip of the hollow needle carries on continuously in the tip of the piercing needle, the through-opening during its expansion to the second equivalent diameter has the first equivalent diameter only for a very short time, so that in this embodiment too—even if only for a very short time—first a through-opening with a first equivalent diameter is produced, which is then immediately further expanded.

In order not to remove material from the inner circumference of the through-opening, or to remove as little material as possible, on introduction of the hollow needle into the through-opening with the first equivalent diameter, according to yet another embodiment the hollow needle is designed with a frustoconical tip which tapers from a diameter at the needle shaft corresponding to the second equivalent diameter, to a diameter at the needle tip corresponding to the first equivalent diameter. The hollow needle with its needle tip therefore abuts closely against the piercing needle when it is slid over the piercing needle, as a result of which no material or at least hardly any material is removed along the inner circumference of the through-opening with the first equivalent diameter when the hollow needle is slid into the through-opening.

The apparatus according to the invention is suitable for use with the method according to the invention; accordingly, the characteristics described above with reference to the method according to the invention, particularly those which concern the concrete design of the piercing needle and hollow needle, can be transferred to the design of the apparatus described below.

The apparatus according to the invention is specially designed for use in the assembly of an elastic sealing element on an electrical conductor, and serves first to produce in the sealing element a through-opening which is then expanded, so that an electrical conductor can then be introduced into this expanded through-opening in the manner described above, and the expanded through-opening can be caused to shrink or contract. In this way tight sealing can be ensured between the electrical conductor and the elastic sealing element.

The apparatus according to the invention for this purpose has a first pin which functionally corresponds to the hollow needle already described above and which can be caused to perform a reciprocating movement, wherein at the front end of this first pin is formed a cutting tip which, on penetration through a sealing element positioned in front of the cutting tip in the direction of reciprocation and designed as a solid body, produces a through-opening in the sealing element in the form of a three-dimensional cut or penetration. Preferably, the cutting tip formed at the front end of the first pin is in the form of a cone of which the shell surface tapers linearly to a single point. Furthermore, the apparatus according to the invention has a second pin for receiving the sealing element which has been provided with a through-opening by the first pin. In order to be able to expand the through-opening produced in the elastic sealing element using the cutting tip of the first pin, in the manner described with reference to the method according to the invention, the outer circumference of the second pin in at least one region has an outer circumference which is larger than the outer circumference of the first pin. In this way, when the elastic sealing element is slid by the first pin over the second pin, the through-opening extending through the elastic sealing element is expanded, in order then to be able to introduce an electrical conductor into this through-opening expanded in this way in the desired manner.

To optimise the process, according to a further embodiment it is provided that the second pin is positioned in direct extension of the cutting tip of the first pin and oriented along the axis of the first pin. Therefore no transfer device is needed to transport the sealing element provided by the first pin with a through-opening, to a second pin; instead, the sealing element can be directly stripped or slid by the first pin over the second pin, if the second pin is positioned in extension of the cutting tip of the first pin and oriented along its axis.

In order to carry out this stripping operation, the first pin can for example be surrounded by a hollow cylinder which can also be caused to perform a reciprocating movement, so that the first pin and the hollow cylinder are slidable relative to each other to perform a relative movement. If for example the elastic sealing element has been pierced by the first pin, so that the cutting tip of the first pin comes to lie directly adjoining the end of the second pin, then for example the hollow cylinder which surrounds the first pin can in turn be caused to perform a reciprocating movement, as a result of which the front end of the hollow cylinder comes to abut with the elastic sealing element on the first pin, so that the sealing element is slid by the first pin over the second pin as a result of the progressive movement of the hollow cylinder.

According to a preferred embodiment, it is here provided that the front end of the hollow cylinder is slidable at least over the cutting tip of the first pin and preferably over the end of the second pin adjacent to the cutting tip of the first pin, so that no additional transfer device is needed in order to be able to slide the elastic sealing element from the first pin onto the second pin.

After the through-opening, which has been produced in the elastic sealing element using the first pin, has been expanded in this way, the elastic sealing element can then be slid in the manner already described above over a hollow needle of which the outer circumference substantially corresponds to the outer circumference of the second pin. An electrical conductor can then be introduced into the sealing element through this hollow needle, as already described above when describing the method according to the invention.

According to another embodiment it is provided that the hollow cylinder surrounding the first pin is for its part designed as a hollow needle which can be slid over the first pin in the direction of its cutting tip, as already described above when describing the method according to the invention, in which the piercing needle to that extent corresponds to the first pin of the apparatus according to the invention.

According to yet another aspect, the object of the invention is achieved by using the apparatus described above in the assembly of an elastic sealing element on an electrical conductor. If the apparatus according to the invention is used in the assembly of an electric sealing element on an electrical conductor, the first pin serves to produce a through-opening in the form of a three-dimensional cut or penetration in the elastic sealing element. For this purpose an elastic sealing element is positioned in front of the cutting tip of the first pin in its direction of reciprocation, so that as a result of the reciprocating movement of the first pin a through-opening is produced in the elastic sealing element with the cutting tip of the first pin, which is then expanded by the second pin as a result of receiving the sealing element.

According to the invention, therefore, for the first time a pin designed in the form of a cone with a cutting tip is used to make a through-opening in an elastic sealing element, which is then expanded in order to be able to introduce an electrical conductor.

Below, the invention will now be described purely by way of example with reference to the attached drawings, in which:

DETAILED DESCRIPTION OF THE INVENTION

First, the method according to the invention is described generally with reference to FIGS. 1 to 8, before an exemplary apparatus is then described with reference to FIGS. 9 to 12, using which the method according to the invention can be carried out.

Figures 1, 2, 3, 4:
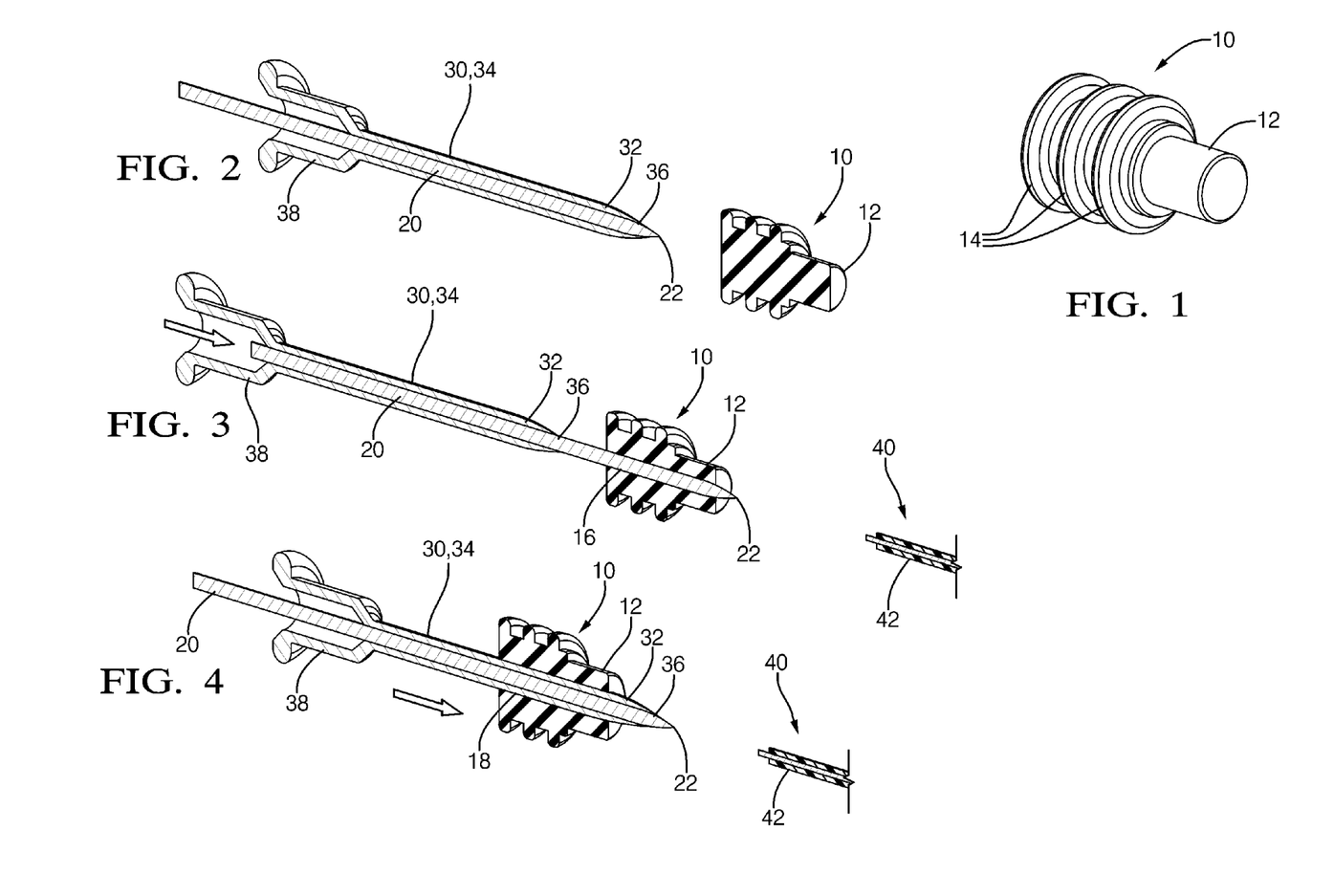
FIG. 1 is a perspective view of an elastic sealing element.
FIGS. 2 to 7 show the procedure of an exemplary embodiment of a method for sheathing an electrical conductor with an elastic sealing element, using an apparatus according to the invention.

FIG. 1 shows an elastic sealing element 10 in a perspective view, which for example has been made by injection moulding as a solid body from a silicone material, example. The sealing element 10 here has a substantially cylindrical main body 12 which in the axial direction is surrounded by three spaced-apart sealing rings 14 which are constructed in one piece with the main body 12.

FIG. 2 shows the initial position of the method according to the invention, before the piercing needle 20 and the hollow needle 30 are inserted in the axial direction in the main body 12 of the sealing element 10 and passed through it. As can be seen from the sectional view of FIG. 2, in which the hollow needle 30 has been slid over the piercing needle 20, the hollow needle 30 has a frustoconical tip 32 which tapers from the needle shaft 34, of which the diameter corresponds to the second equivalent diameter to be made in the sealing element 10 in the order of magnitude of approximately 1 mm (see FIG. 8: "expand ring"), to its needle tip at the front end 36 of the tip 32 to a first equivalent diameter to be made in the sealing element 10 in the order of magnitude of approximately 0.1 mm (see FIG. 8: "cut point").

Figure 8:
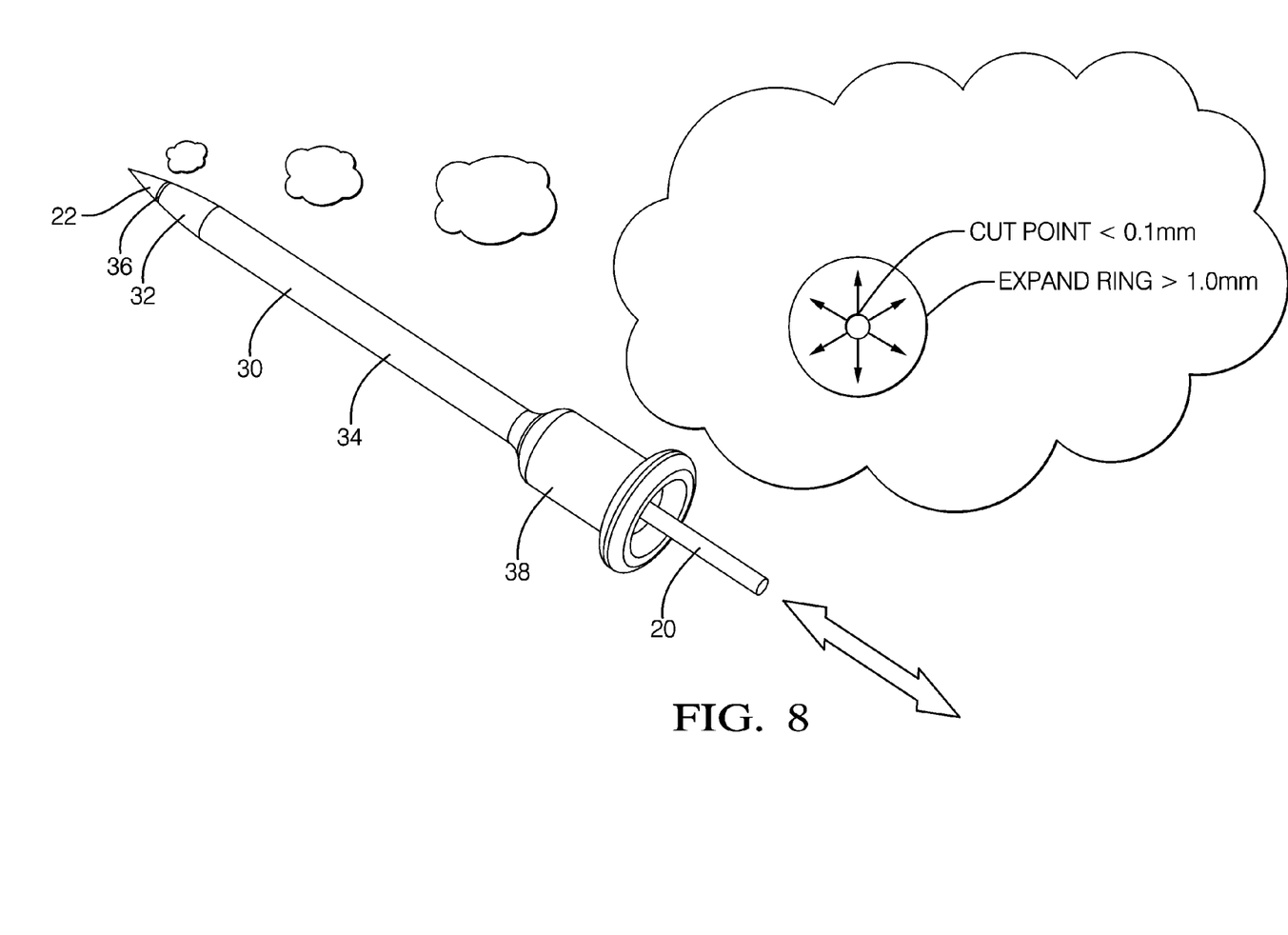
FIG. 8 shows a perspective view of a hollow needle which has been slid over a piercing needle.

In the drawings of FIGS. 2 and 8 it can be seen that the tip 32 of the hollow needle 30 carries on continuously in the tip 22 of the piercing needle 20 which is arranged slidably in the hollow needle 30, which means that the outside diameter of the piercing needle 20 corresponds substantially to the inside diameter of the hollow needle 30 or to the diameter of the hollow needle 30 at its front end 36. At its end opposite its frustoconical tip 32, the hollow needle 30 has an insertion funnel 38 which serves to facilitate introduction of the piercing needle 20 into the hollow needle 30 and if necessary also the introduction of an electrical conductor into the hollow needle 30.

Below, an embodiment of the method according to the invention will now be essentially described with reference to FIGS. 3 to 7. After the two needles 20, 30 inserted one inside the other as in FIG. 2 have been axially offset from the sealing element 10 in the manner shown, a first step involves beginning to make a through-opening 16 with a first equivalent diameter in the sealing element 10, by sticking the piercing needle 20 tip 22 first in the main body 12 of the sealing element 10 and passing it through the latter, as can be seen from the transition from FIG. 2 to FIG. 3 (see also FIG. 8: "cut point").

After a through-opening 16 with a first equivalent diameter has been produced in the sealing element 10 in this way, in a further step the through-opening 16 with the first equivalent diameter is then expanded to a second equivalent diameter (see FIG. 8: "expand ring"), by sliding the hollow needle 30 tip 32 first on the piercing needle 20 through the main body 12 of the sealing element 10 and so sliding it through the previously made through-opening 16 with the first equivalent diameter, as shown clearly in FIG. 4.

Figures 5, 6, 7:
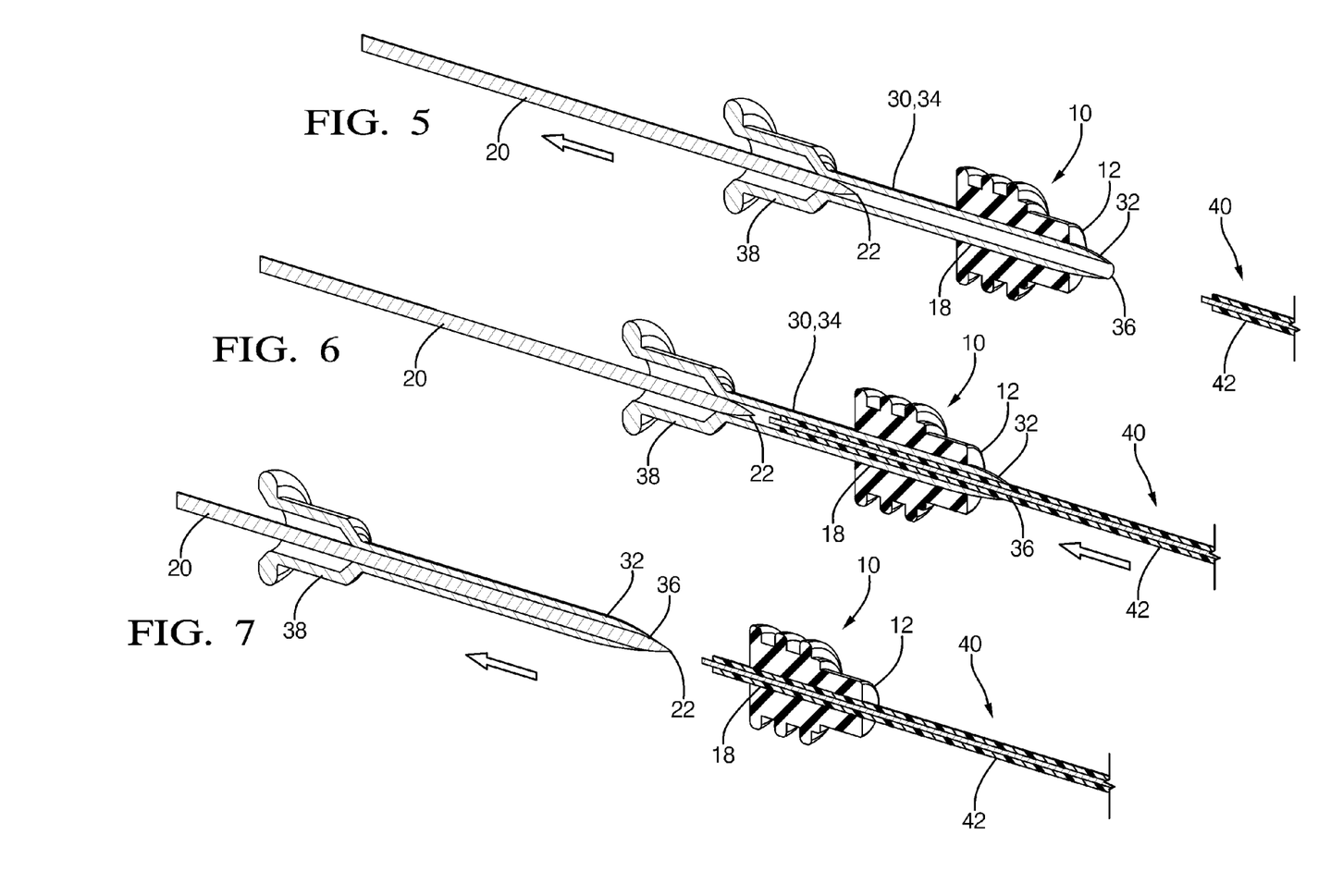

After a through-opening 18 with a second equivalent diameter of approximately 1 mm has been made in this way in the main body 12 of the sealing element 10, the piercing needle 20 is then retracted again as in FIG. 5, in order to create space inside the hollow needle 30 for receiving an electrical conductor 40 which is surrounded with insulation 42 and which in FIG. 5 is located at an axial distance from the tip 32 of the hollow needle 30 still located in the sealing element 10, and has an outside diameter of approximately 0.8 mm.

In a further step, the electrical conductor 40 can therefore now be introduced into the through-opening 18 expanded to the second equivalent diameter or into the interior of the hollow needle 30. As an alternative to the embodiment shown in the figures, however, the electrical conductor 40 can also, at the same time as retraction of the piercing needle 20 from the hollow needle 30, be introduced into the interior thereof. For this purpose, for example the front end of the electrical conductor 40 could be attached to the tip 22 of the piercing needle 20 or to the end of the piercing needle 20 opposite the tip 22 of the piercing needle 20, in order to pull the electrical conductor 40 with the aid of the piercing needle 20 into the interior of the hollow needle 30, by pulling the piercing needle 20 out of the hollow needle 30.

After the electrical conductor 40 has been introduced into the interior of the hollow needle 30 in one of the ways described above, the hollow needle 30 is then pulled out of the sealing element 10, so that only the electrical conductor 40 remains in the sealing element 10, as shown in FIG. 7. Due to pulling the hollow needle 30 out of the sealing element 10, at the same time the sealing element 10 as a whole or the through-opening 18 previously expanded to the second equivalent diameter is caused or allowed to contract to approximately its first equivalent diameter in the order of magnitude of 0.1 mm, so that not only can tight sealing be ensured between the electrical conductor 40 and the sealing element 10, but also a frictional connection between the electrical conductor 40 and the sealing element 10, by which the sealing element 10 is held reliably on the electrical conductor 40.

As far as one element being pulled out of the other element is mentioned in the description above, this means that the one element is completely removed from the other element, as this applies to the hollow needle 30, which as in FIG. 7 is completely pulled out of the sealing element 10.

By contrast, the wording according to which one element is pulled out of the other element does not necessarily mean that the one element is completely pulled out of the other element, as this applies to the piercing needle 20, which as in FIG. 5 has been only partly pulled out of the hollow needle 30.

Figure 10:
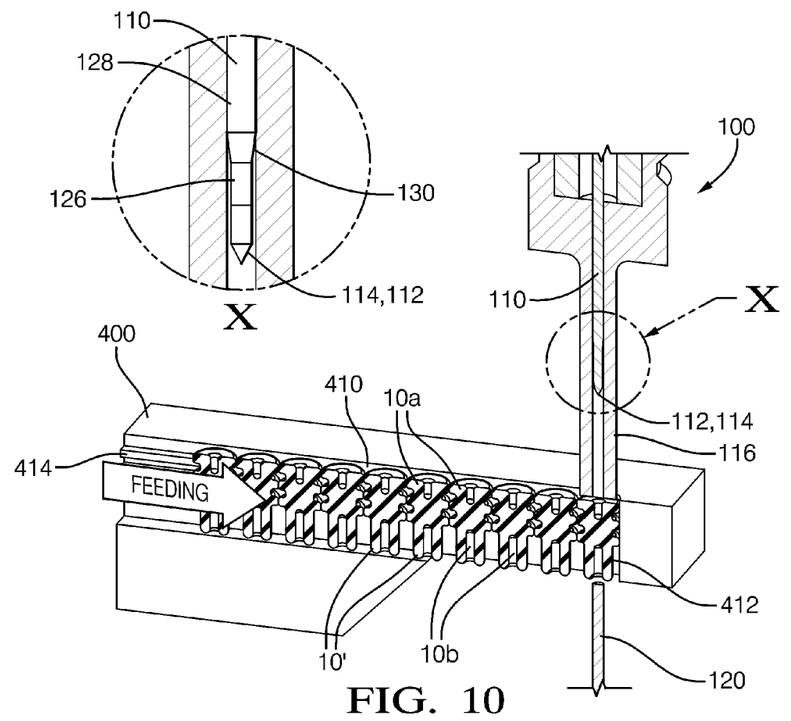
FIG. 10 shows a penetrating device according to the invention, which can be used with the method according to the invention.
Figure 11:
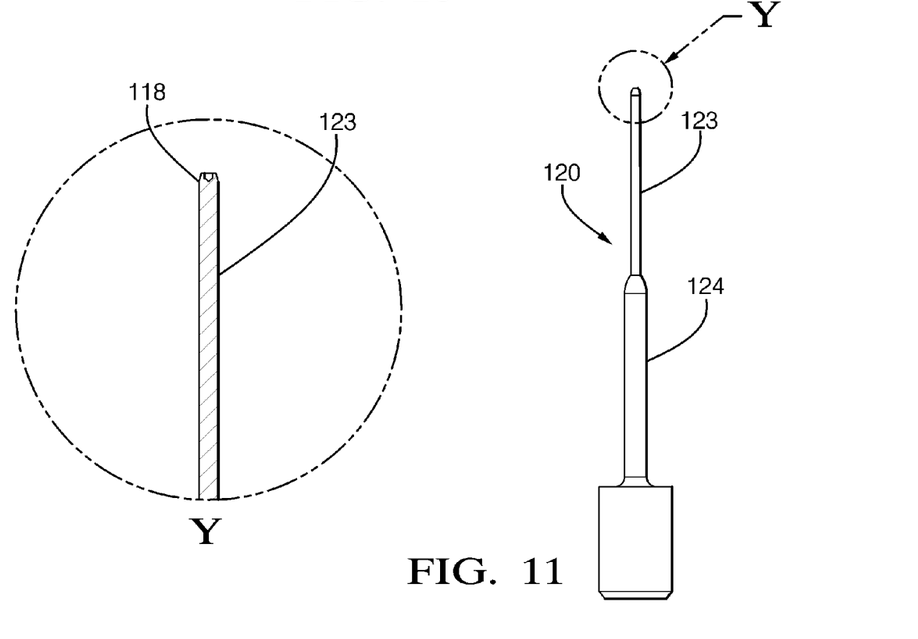
FIG. 11 shows the second pin of the penetrating device according to the invention.

Below, an exemplary embodiment of a penetrating device 100 according to the invention will now be described with reference to FIGS. 9 to 11, which can be used when carrying out the method according to the invention.

Figure 9:
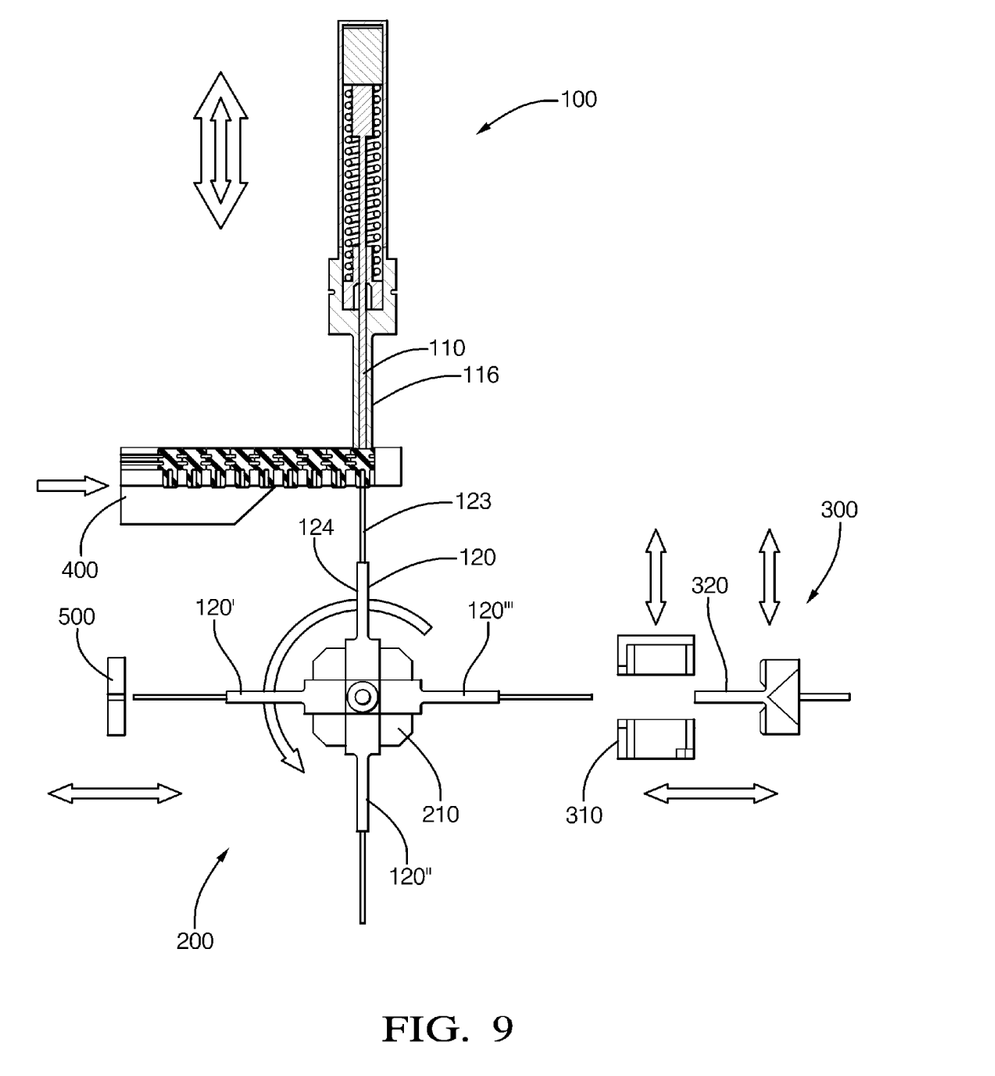
FIG. 9 shows a machine for sheathing an electrical conductor with an elastic sealing element.

The machine shown in FIG. 9 essentially consists of a penetrating device 100 according to the invention, a transfer device 200 and a cable assembly device 300. The penetrating device 100 according to the invention is shown in an enlarged view in FIG. 10. As can be seen from FIG. 10 in conjunction with FIG. 9, the penetrating device 100 according to the invention essentially consists of a first pin 110 at the front end of which is formed a cutting tip 112 in the form of a cone 114 linearly tapering to a point (see detail "X"). Adjoining the conical tip 112 is a first shaft section 126 of which the diameter corresponds to the diameter of the bottom surface of the cone 114. This first shaft section 126 widens over a cone section 130, in order to continue in a second shaft section 128.

The first pin 110 is here surrounded by a hollow cylinder 116 of which the inside diameter substantially corresponds to the outside diameter of the second shaft section 128 of the first pin 110. The design of the first pin 110 with two shaft sections 126, 128 of different thickness here proves advantageous insofar as, in the event that through-openings of different diameter are to be produced with the apparatus 100, only the first pin 110, but not the hollow cylinder 116 which serves as a guide for the first pin 110, has to be exchanged as a result. In order to be able to make through-openings of different diameter, it is sufficient to vary just the diameter of the first shaft section 126, because only this section penetrates through the sealing element to be treated, whereas the second shaft section 128 has purely a guiding function.

The first pin 110 and the hollow cylinder 116 are in each case connected to a drive, not shown, which can be controlled in such a way that the first pin 110 and the hollow cylinder 116 can perform a reciprocating movement independently of each other, which means that a relative movement occurs between the hollow cylinder 116 and the first pin 110, as shown in FIG. 9 by the two double arrows nested one inside the other. Here the larger, outer arrow shows the reciprocating movement of the hollow cylinder 116, while the smaller, inner arrow shows the reciprocating movement of the first pin 110.

In addition the penetrating device 100 according to the invention has a second pin 120, which in the embodiment shown in FIG. 9 at the same time forms part of the transfer device 200, which comprises four such second pins 120, 120', 120", 120''' which are in each case arranged at right angles to each other at a turnstile 210 of the transfer device 200. The second pin 120 is positioned in extension of the cutting tip 112 of the first pin 110 and is oriented along the axis of the first pin 110.

To supply the penetrating device 100 according to the invention with sealing elements 10', there is provided a transport device 400 with a transport channel 410 which ends in a channel 412 which extends through the transport device 400 in the direction of the two pins 110, 120. In the transport channel 410 are held a plurality of sealing elements 10' which are supplied to the channel 412 by vibration. On the side walls of the transport channel 410 are formed several guide ribs 414 which engage in the gaps between the sealing rings 14 of the sealing elements 10', so that the latter do not fall down out of the channel 412 by force of gravity.

The sealing elements 10' shown in FIG. 10 essentially correspond to the sealing element 10 described with reference to FIG. 1, but differ from the latter in that in the sealing elements 10' or in their cylindrical main body 12 are formed two blind holes 10a and 10b which, starting from the mutually opposed end faces of the sealing element 10', extend into it in the axial direction. Between these blind holes 10a and 10b the sealing element 10' is formed as a solid body in order to be able to apply the necessary clamping force which is required to ensure tight sealing relative to an electrical conductor with a very small diameter.

Below, the use of the penetrating device 100 according to the invention in the assembly of an elastic sealing element 10' on an electrical conductor will now be described essentially with reference to the sequence of diagrams in FIG. 12.

Figure 12:
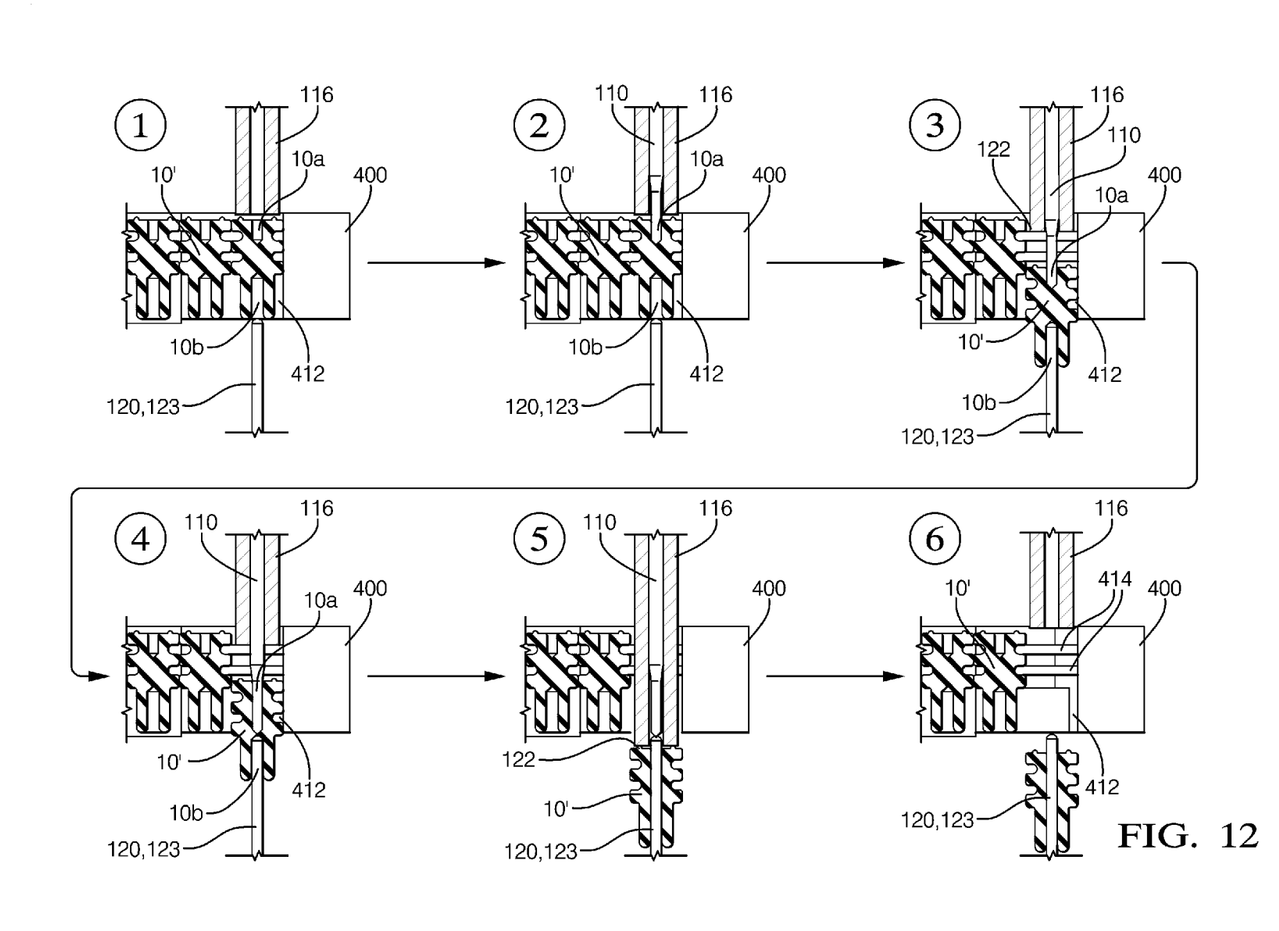
FIG. 12 shows in a sequence of diagrams the use of the penetrating device according to the invention to make a through-opening in an elastic sealing element.

As can be seen from the transition from diagram 1 to diagram 2 of FIG. 12, first of all the first pin 110 is slid through the hollow cylinder 116 cutting tip 112 first, until the cutting tip 112 encounters the bottom of the upper blind hole 10a. As the advancing movement of the first pin 110 progresses, the elastic sealing element 10' is then forced out of the channel 412, wherein the sealing rings 14 elastically deformed by the ribs 414 in the transport channel 410. As the second pin 120 is axially aligned with the first pin 110, as the advancing movement of the first pin 110 progresses the second pin 120 engages from below in the other blind hole 10b of the sealing element 10', until the end of the second pin 120 adjacent to the first pin 110 comes into abutment with the bottom of the lower blind hole 10b (see diagram 3 of FIG. 12). Hence the sealing element 10' cannot tilt during subsequent piercing using the first pin 110.

As the advancing movement of the first pin 110 progresses still further, the latter then penetrates the sealing element 10' with its first shaft section 126 in the desired manner (see diagram 4 of FIG. 12), by making a through-opening in the form of a three-dimensional cut with the conical cutting tip 112 in the sealing element 10'. Here, the two blind holes 10a, 10b to a certain extent serve as guides for counteracting unwanted tilting of the sealing element 10' when the latter is pierced by the first pin 110. In order that the sharpness of the cutting tip 112 is not lost in the event that the cutting tip 112 encounters the adjacent end of the second pin 120 in an undesirable manner, in the end of the second pin 120 adjacent to the first pin 110 is formed a crater-like recess 118 (see detail "Y" of FIG. 11) which the cutting tip 112 can enter without damage.

After a through-opening has been made in this way in the sealing element 10' in the desired manner, the hollow cylinder 116 is then slid down as in the transition from diagram 4 to diagram 5 of FIG. 12, so that its front end 122 comes into abutment with the sealing element 10' and slides the latter completely over the second pin 120 as the advancing movement of the hollow cylinder 116 progresses. Then the first pin 110 and the hollow cylinder 116 can be retracted again, in order then to be able to provide the next sealing element 10' with a through-opening (see FIG. 12).

After the sealing element 10' has been slid over the second pin 120 in the manner described above using the penetrating device 100 according to the invention, the sealing element 10' can then be slid over the thickened section 124 of the second pin 120 using a sliding plate 500 as in FIG. 9, by sliding this sliding plate 500 to the right over the first pin 110. For this purpose, the second pin 120 must first be turned through 90° as per the arrow of rotation, using the transfer device 200, so that the sliding plate 500 can be slid over the second pin 120, as shown by the double arrow of FIG. 9.

After the sealing element 10' has been slid over the thickened section 124 in this way and so expanded, the transfer device 200 can then be turned through a further 180°, in order then to be able to assemble the expanded sealing element 10' on the electrical conductor 40 shown, using the cable assembly device 300.

This cable assembly device 300 essentially consists of a two-part stripper device 310 and a likewise two-part hollow needle 320, which can both be displaced independently of each other, as shown in FIG. 9 by the respective horizontal double arrow. Likewise the halves of which the two devices 310, 320 consist can be moved apart from each other, as shown in FIG. 9 by the vertically oriented double arrows.

The stripper device 310 here serves to slide the expanded sealing element 10' over the hollow needle 320 which was previously slid over the unthickened section 123 of the second pin 120 and of which the outer circumference substantially corresponds to the outer circumference of the thickened section 124 of the second pin 120. Next the stripper device 310 and the hollow needle 320 are moved to the right together, as a result of which the electrical conductor 40 is introduced into the interior of the hollow needle 320. When sliding of the hollow needle 320 to the right stops, the stripper device 310 which has come to a standstill then holds fast in position the sealing element 10' held by it, so that, as a result of pulling the hollow needle 320 out of the stripper device 310 in the desired manner, contraction of the expanded sealing element 10' is brought about, in order thus to ensure reliable sealing of the electrical conductor 40 relative to the elastic sealing element 10'.

Although in the embodiment described above with reference to FIG. 9 the transfer device 200 is used with four second pins 120, 120', 120'', 120''' arranged perpendicularly to each other, in order to transfer the sealing element 10' provided with a through-opening to the hollow needle 320, for the sake of completeness at this point it will be pointed out that according to a further embodiment it is provided that the hollow needle 320 is positioned directly in extension of the cutting tip 112 of the first pin 110 and oriented along its axis, as this applies to the second pin 120, so that the transfer device 200 can be dispensed with. In this case the hollow needle 320 corresponds in function to the second pin 120, as the outer circumference of the hollow needle 320 substantially corresponds to the thickened section 124 of the second pin 120.

Likewise it would be possible to dispense with the sliding plate 500 if the hollow cylinder 116 were slidable over the thickened section 124 of the second pin 120, as provided according to a further embodiment.

The invention claimed is:

1. An apparatus for use in the assembly of an elastic sealing element on an electrical conductor, comprising:
   a first pin which performs a reciprocating movement and at the front end of which is formed a cutting tip which, on penetration through the elastic sealing element positioned in front of the cutting tip in the direction of reciprocation, produces a through-opening in the elastic sealing element; and
   a second pin distinct from said first pin for receiving the elastic sealing element which has been provided with the through-opening by the first pin, wherein the first pin is external to the second pin, wherein an outer circumference of the second pin in at least one region is larger than an outer circumference of the first pin for expansion of the through-opening produced in the elastic sealing element and wherein the first pin is surrounded by a hollow cylinder, the first pin and the hollow cylinder being slideable relative to each other to perform a relative movement, so that a front end of the hollow cylinder comes into abutment with the elastic sealing element and slides the elastic sealing element completely over the second pin.

2. The apparatus according to claim 1, wherein the cutting tip of the first pin is formed by a cone which is formed at the front end of the first pin.

3. The apparatus according to claim 2, wherein the cone continues in a first shaft section having a first diameter, which in turn widens over a cone section, in order to continue in a second shaft section having a second diameter.

4. The apparatus according to claim 1, wherein an end of the second pin is positioned adjacent the cutting tip of the first pin and continuously extends along the axis of the first pin.

5. The apparatus according to claim 1, wherein the front end of the hollow cylinder is slideable-over the cutting tip of the first pin.

6. The apparatus according to claim 5, wherein the front end of the hollow cylinder is slideable over an end of the second pin adjacent to the cutting tip of the first pin.

7. The apparatus according to claim 1, further comprising:
a rotatable turnstile; and
a plurality of second pins arranged at right angles to each other and attached to said turnstile.

* * * * *